United States Patent [19]

Thengs et al.

[11] Patent Number: 5,181,802
[45] Date of Patent: Jan. 26, 1993

[54] OIL COLLECTOR

[76] Inventors: Norvald Thengs, Ekrestubben 4, N-4040 Hafrsfjord; John D. Olsen, Jonas Liesgo 4, N-4021 Stavanger, both of Norway

[21] Appl. No.: 678,979
[22] PCT Filed: Oct. 23, 1989
[86] PCT No.: PCT/NO89/00109
§ 371 Date: Apr. 26, 1991
§ 102(e) Date: Apr. 26, 1991
[87] PCT Pub. No.: WO90/04683
PCT Pub. Date: May 3, 1990

[30] Foreign Application Priority Data

Oct. 27, 1988 [NO] Norway ................................. 884779

[51] Int. Cl.⁵ ............................................. E02B 15/04
[52] U.S. Cl. ..................................... 405/70; 405/63; 210/924
[58] Field of Search ...................... 405/63, 70, 71, 16, 405/19; 210/242.4, 924

[56] References Cited

U.S. PATENT DOCUMENTS

| | | | |
|---|---|---|---|
| 2,071,779 | 2/1937 | Willing | 405/19 |
| 3,617,565 | 11/1971 | Fahlvik | 210/924 X |
| 3,617,566 | 11/1971 | Oshima et al. | 210/924 X |
| 3,739,913 | 6/1973 | Bogosian | 210/924 |
| 4,366,067 | 12/1982 | Golding et al. | 210/924 X |
| 4,497,712 | 2/1985 | Cowling | 210/924 X |
| 4,537,877 | 8/1985 | Ericsson | 210/924 X |
| 4,635,576 | 1/1987 | Bowers | 405/16 X |
| 4,925,343 | 5/1990 | Raible et al. | 210/924 X |
| 4,959,154 | 9/1990 | Simmons | 210/924 X |

FOREIGN PATENT DOCUMENTS

| | | |
|---|---|---|
| 0039522 | 11/1981 | European Pat. Off. |
| 0069675 | 1/1983 | European Pat. Off. |
| 1952373 | 4/1970 | Fed. Rep. of Germany |
| 1815592 | 6/1970 | Fed. Rep. of Germany |
| 2135936 | 1/1972 | Fed. Rep. of Germany |
| 47915 | 1/1974 | Finland |
| 137688 | 12/1977 | Norway |
| 418863 | 6/1981 | Sweden |
| 1430446 | 3/1976 | United Kingdom |
| 2053883 | 2/1981 | United Kingdom |

Primary Examiner—Dennis L. Taylor
Assistant Examiner—John A. Ricci
Attorney, Agent, or Firm—Hill, Steadman & Simpson

[57] ABSTRACT

An absorbent oil collector is used as an oil spill combating apparatus and based on the use of an oil-absorbent material, e.g. a specially prepared wood fiber mass. In order to provide an oil collector of the kind concerned, which is flexible in that sense that its shape/size easily may be adapted to the actual oil spill situation and which may easily be picked up and collected when the absorbent material has been saturated with oil, the oil-absorbent material is encased within cylindrical stockings (1) of liquid-permeable material and which, along at least one longitudinal edge, is provided with catches, hooks or similar couplers (4) for the joining of a plurality of stockings (1), modules, forming a mat (5), which through rolling may be transformed into a section of a boom.

12 Claims, 1 Drawing Sheet

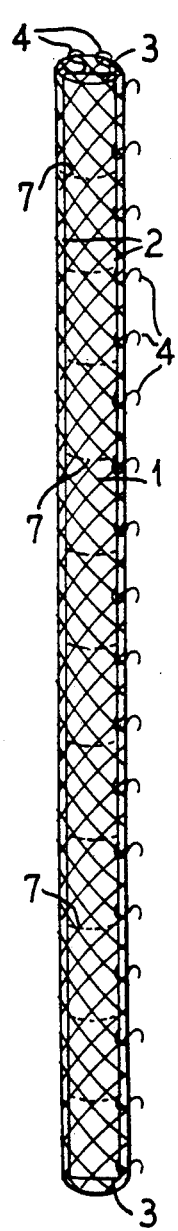
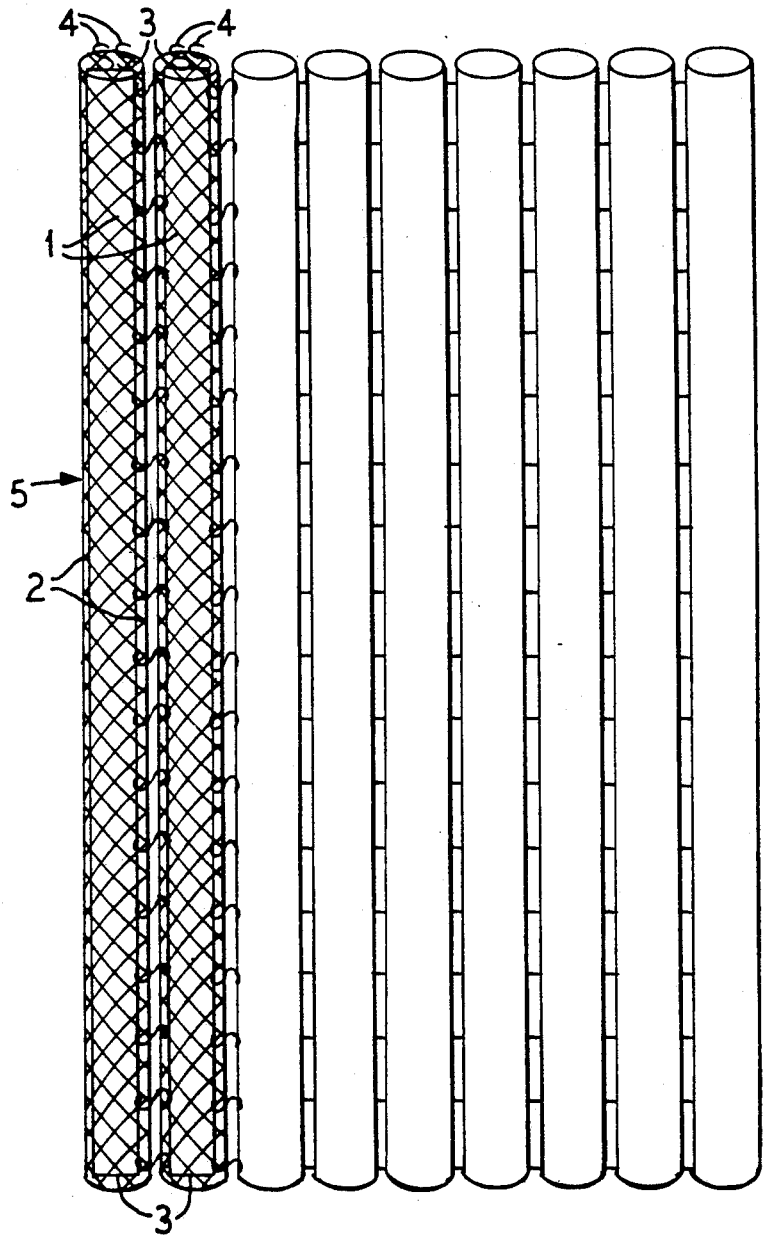
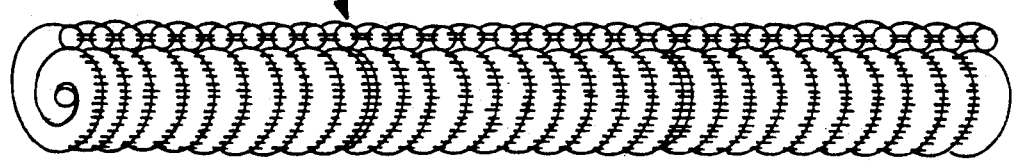

OIL COLLECTOR

This invention relates to a absorbent oil collector for use as an oil spill combating apparatus and which is based on the use of an oil-absorbent material, e.g. a specially prepared wood fiber mass.

Oil spill combating equipment is known in the form of e.g. mechanically acting oil booms and skimmers. These are very space-consuming and, generally, heavy and rather awkward, so that special equipment and/or vessels are required in order to make use of them. Also, they have reduced effect e.g. in extreme weather conditions and, moreover, in shallow waters and in the shore regions.

Likewise, there exist a number of chemical preparations for the disintegration of oil floating on the surface, but such a chemical disintegration of the oil may give rise to the formation of poisonous chemical compounds that poison and pollute the sea water.

Oil absorbing materials derived from naturally occurring materials, e.g. pearlite, sand, straw, sawdust or peat (moss) have previously been used, in order to remove oil spillage in habours, rivers or other waters through the dispersion of the absorbent material over the surface of the polluted area. Granulated natural rubber latex having good oil-absorbing properties has also been used in order to remove surface spillage of oil from water. A more specific preparation for the removal of oil spillage on water and comprising hydrophobated, or water-proofed, wood mass, is described in Norwegian laid open application No. 137,688.

In GB patent specification No. 2,053,883, a method for the removal of oil from the surface of a water mass through the absorption of the oil in dispersed granulated mineral wool which is to be picked up later, is described.

GB patent specification No. 1,430,446 relates to a method for the absorption of viscous substances, wherein the absorbent material consists of a mechanically finely divided cellulose material.

Swedish laid open application No. 418,863 relates to an absorbent material based on sulfide reject for combating an oil spill, sulfite reject being a waste product of paper production using the sulfite process. The sulfite reject, or spent sulfite liquor, contains short wood fibers with fringes, much water, and additional superfluous materials.

European patent application No. 0 039 522 relates to a liquid-absorbent material wherein a fibre suspension substantially consists of cellulose.

From GB patent specification, No. 1,289,490 , an absorbent material is known, consisting of a mass of an artificial or synthetic polymeric material which is removed from the surface of the water when it has become impregnated with floating hydrocarbons.

Also these known oil-absorbent materials are intended to be dispersed over the water surface, and to be removed therefrom through collection after having absorbed oil. The collection of the materials/preparations dispersed over the water surface requires comprehensive working operations, especially during poor weather conditions. an object of the present invention is to eliminate disadvantages associated with the prior art and to provide a absorbent oil collector in the form of a mat/boom which is flexible in that sense that its shape/-size easily may be adapted to the actual oil spill situation.

In accordance with the invention, this object is achieved by an absorbent oil collector to be used as an oil collection apparatus, wherein an oil-absorbent material, e.g. a specially prepared wood fiber mass, is encased within a preferably cylindrical stocking of liquid-permeable material, e.g. mesh material, characterized in that along diametrically opposite sides of the stocking and at both end portions of the stocking, plastic wires are inserted, and that along one longitudinal plastic wire and to the plastic wire at one end portion of the stocking, catches, hooks or other coupling means are attached, in order to allow the joining of a plurality of stockings-wherein each stocking, thus, constitutes a module which may be used for forming a mat of any desired size, and which through rolling may be transformed into a section of a boom of any desired thickness, the coupling means being adapted to cooperate with plastic wires inserted into other modules.

The absorbent oil collector as defined above may include partitions that have been sewn into each single stocking, e.g. at each running metre, so that the absorbent material does not displace itself within the stocking.

The invention is based on a module system wherein each module comprises a cylindrical stocking of water-permeable material enclosing the oil-absorbent material, e.g. wood fiber mass. The individual modules have catches, hooks or similar coupling means in order to be joined together forming a mat having a size adapted to the actual oil spill situation. Such mats may be rolled and coupled together, thereby easily being transformed into booms. The used oil-impregnated mats/booms may then be disassembled, the individual used modules finally being placed into their original packaging sleeves of plastic.

The oil spill combating apparatus according to the invention is used in a very simple manner, independent of weather and wind, the extent and the location of the oil contamination. The system in accordance with the invention is also used for removing oil spillage on shore. The system distinguishes itself by being very extensively flexible. It is easy to use and to handle, simple to assemble and enlarge, collect after use, disassemble and transport/store. Also, it is economical to produce. Therefore, it is practical to purchase and hold the present oil collecting apparatus in readiness.

A preferable oil-absorbent material is i.e. a specially prepared wood fiber mass having a very large absorbent ability (4-5 times the weight of the mass). The absorption of oil therefore, takes, place very rapidly. It only takes a few minutes in order to fill an oil boom with ·spillage or crude oil. Moreover, the greater the movements of the water, the more accelerated the oil absorption. The actual absorbent material will attracts very little sea water, even after a prolonged time in the sea. Also, there is relatively little spillage when treating the oil-filled booms. As mentioned, after disassembly, these may be packed again, using their original packages.

The invention is further explained in the following in association with an embodiment illustrated in the accompanying drawing, wherein:

FIG. 1 shows a side elevational view of a module in the form of an oil-absorbent material encased in a cylindrical stocking of liquid-permeable material;

FIG. 2 in a top plan view shows a module system in the form of a mat consisting of nine joined modules of FIG. 1;

FIG. 3 in perspective shows a boom constituted of several rolled mats of FIG. 2.

The oil collector according to the invention comprises a number of modules of FIG. 1.

Each module consists of a cylindrical network stocking 1 of plastic or the like. Along the longitudinal edges of the stocking 1 and, preferably, also along the lateral edges, plastic wires 2 and 3, respectively, have been inserted. To one of the longitudinal plastic wires 2, catches, hooks or similar coupling means 4 have been attached, in order to allow a plurality of modules to be joined, thereby forming a larger unit in the form of mats 5, FIG. 2. The cylindrical mesh or netting stocking 1 is filled with a specially prepared wood fiber mass or corresponding oil-absorbent material having excellent absorption properties. It is preferred to sew in appropriate partitions 7 within the module, e.g. at each running metre, so that the absorption material does not become displaced but keeps itself evenly distributed within each module.

Also the lateral edges of the module may be provided with catches, hooks or similar coupling means 4, allowing the joining of modules in the longitudinal direction also, in order to form large mats.

Oil collector mats according to FIG. 2 are very simply transformed into boom systems 6 of various thicknesses and lengths, FIG. 3.

In accordance with the invention, one may, therefore, on the basis of a number of modules of FIG. 1, build mats, FIG. 2, which are used wherever such are best suited; from said mats 5 one may build booms to be used wherever these are preferred.

The booms/mats are very light in weight. A single module, about 25×500 centimeters, will weighs about 5 kilograms, and a standard mat, about 10 modules, about 50 kilograms.

A module, about 5 kilograms of absorption mass, will have an absorption capacity corresponding to about 20-25 liters of crude oil/spillage oil, and, thus, a standard mat will attracts about 200-250 liters of oil.

As mentioned, each module may be packed separately. However, it might be more practical to pack rolled standard mats in plastic bags for transport/storage. The same package may be reused after the mat has been impregnated with oil.

When transforming standard mats into booms 6, FIG. 3, one may either roll the mat together laterally in its longitudinal direction and attain a boom unit having a length of 5 meters, or roll the mats together longitudinally attaining a boom unit having a length of 2.50 meters and being twice as thick as in the former case.

Although other modifications and changes may be suggested by those skilled in the art, it is the intention of the inventors to embody within the patent warranted hereon all changes and modifications as reasonably and properly come within the scope of their contribution to the art.

We claim:

1. An absorbent oil collector to be used as an oil spill combating apparatus, comprising:
    a stocking of liquid-permeable material;
    an oil-absorbent material encased within said stocking
    wires inserted along diametrically opposite sides of said stocking and at both end portions of the stocking, and
    coupling means attached along one longitudinal wire and to the wire at one end portion of the stocking in order to allow joining of a plurality of stockings—wherein each stocking, thus, constitute a module—forming a mat of any desired size, and which through rolling may be transformed into a section of a boom of any desired thickness, said coupling means being adapted to cooperate with wires inserted into other modules.

2. An absorbent oil collector as defined in claim 1, further comprising:
    partitions sewn into each single stocking so that the absorbent material does not displace itself within the stocking.

3. An absorbent oil collector as claimed in claim 1, wherein said oil-absorbent material is a wood fiber mass.

4. An absorbent oil collector as claimed in claim 1, wherein said stocking of liquid-permeable material is of mesh.

5. An absorbent oil collector as claimed in claim 1, wherein said stocking is cylindrical.

6. An absorbent oil collector as claimed in claim 1, wherein said wires are plastic wires.

7. An arborbent oil collector as claimed in claim 1, wherein said coupling means comprises a plurality of hooks.

8. An oil collector for absorbing oil on a body of water, comprising:
    a plurality of elongated hollow cylinders of a porous material;
    an absorbent material in each of said plurality of elongated hollow cylinders for absorbing oil; and
    a plurality of connecting means on a longitudinal side of each of said plurality of elongated hollow cylinders for connecting ones of said plurality of elongated hollow cylinders to each other in side-by-side relation to form a mat, said connecting means comprising reinforcing wires extending along said longitudinal side of each of said cylinders and means for selectively connecting said reinforcing wires of adjacent ones of said cylinders to one another.

9. An oil collector as claimed in claim 8, wherein said porous material is of a mesh or netting.

10. An oil collector as claimed in claim 8, wherein said plurality of connecting means comprises:
    hooks extending laterally from each of said plurality of elongated hollow cylinders along at least one side, said hooks being connected at one end to said reinforcing wires and being connectable at another end to reinforcing wires of adjacent cylinders.

11. An oil collector as claimed in claim 8, further comprising:
    further connecting means on ends of said plurality of elongated hollow cylinders for connecting ones of said plurality of elongated hollow cylinders end-to-end.

12. An absorbent oil collector to be used as an oil spill combating apparatus, comprising:
    an elongated cylindrical stocking of liquid-permeable material of moderate tensile strength;
    an oil-absorbent material encased within said stocking of liquid-permeable material;
    reinforcing wires inserted along diametrically opposite longitudinal sides of said stocking and at both end portions of the stocking, and hook-like coupling means attached along one longitudinal side of the stocking and to the wire at one end portion of the stocking in order to allow joining of a plurality of stockings—wherein each stocking, thus, constitute a module—forming a mat of any desired size, and which through rolling may be transformed into a section of a boom of any desired thickness, said hook-like coupling means being adapted to cooperate with reinforcing wires inserted into other modules.

* * * * *